United States Patent [19]

Moore

[11] 4,324,519
[45] Apr. 13, 1982

[54] WOOD HANDLING MACHINE
[76] Inventor: Robert L. Moore, P.O. Box 836, North Little Rock, Ark. 72115
[21] Appl. No.: 239,014
[22] Filed: Feb. 27, 1981
[51] Int. Cl.³ .............................................. B27B 31/00
[52] U.S. Cl. ....................................... 414/28; 101/35; 144/3 N; 414/113
[58] Field of Search ...................... 414/28, 36, 54, 113, 414/117; 144/3 N, 328; 101/4, 35, 41, 44

[56] References Cited
U.S. PATENT DOCUMENTS
1,715,167  5/1929  McDonough ......................... 101/35
3,190,014  6/1965  Arnold et al. ...................... 101/41 X
3,596,776  8/1971  Melin .................................. 414/28

FOREIGN PATENT DOCUMENTS
2551846  6/1977  Fed. Rep. of Germany ...... 414/117

Primary Examiner—Leslie J. Paperner
Attorney, Agent, or Firm—Holman & Stern

[57] ABSTRACT

A wood handling machine for handling stacked layers of board lumber to facilitate marking the boards comprising essentially a support bed for supporting a stack of boards in layers, a fluid pressure operated clamping device to clamp the stack and hold it in alignment, a pushing device at one end of the stack for pushing at least one layer at a time of the boards a predetermined distance to expose the surface of the next layer of boards for marking, and a stop bar at the other end of the stack to prohibit the movement of the next adjacent layer of boards during the operation of the pushing bar. The pushing bar is provided with an indexing means which automatically controls the incremental movement of the push bar a distance comparable to the thickness of the layer of boards. Fluid pressure cylinder and piston devices are used in combination with valves in a fluid pressure circuit for controlling and operating the pushing bar and stop bar and raising and lowering them into the predetermined desired position.

9 Claims, 5 Drawing Figures

WOOD HANDLING MACHINE

BRIEF SUMMARY OF THE INVENTION

This invention relates to a wood handling machine of the type wherein stacked lumber is marked layer by layer prior to further processing, and, more particularly, to an apparatus which receives a stack of lumber, usually precut in the form of elongated boards which are stacked in vertical layers for marking and adjusts the layers in the stack as they are marked.

Lumber which has been cut to predetermined dimensions or standardized sizes must be either grade-stamped or otherwise stamped to indicate a particular form of treatment such as wood-preservative treatment. The stamp must be placed on the face of the lumber so that it is readily visible. This has been a cause for some concern to companies in the lumber industry that take precut dimensioned lumber and treat it in certain ways, such as by impregnation of a wood-preservative, for example. The lumber is received in large quantities in the form of stacked layers and it has been a longstanding problem to rapidly and efficiently mark the face of the lumber with the minimum amount of labor and equipment required to unstack the restack the lumber for shipment and further handling. Applicant's invention as described hereinafter solves the problems by providing an apparatus which will receive a stack of lumber and adjust it layer by layer while performing the marking or stamping operation in sequence.

Toward this end, the apparatus of the present invention comprises a base member having two spaced clamping devices which bear on the sides of the stacked layers and are power-operated to align and retain the precut lumber in layers stacked vertically into a substantially rectangularly shaped stack. Mounted on the frame at one end is a vertically adjustable pushing member which engages the end of a layer and pushes it lengthwise with respect to the stack to expose the next layer for marking. Also on the frame at the opposite end is a vertically-adjustable stop member which holds the stack against lengthwise movement as the pushing member is operating to push the marked layer lengthwise to expose the next layer for marking. A stamping device may be mounted on the machine to stamp the face of the top layer of lumber boards near one end thereof to begin the operation. After this initial stamping operation, the pushing device and the stop means are vertically adjusted so that the stop member abuts the end of the second layer of boards and the pushing device engages the end of the first layer of boards so that upon operation of the pushing device thereafter, the first layer of boards is moved lengthwise a pre-determined distance to expose a sufficient amount of the top face of the second layer of boards for subsequent marking by the stamping device. These machine operations all occur in sequence until the entire stack of lumber is marked. Thereafter, the stack which is still in a rectangular configuration is released by retraction of the clamps and can be removed for shipment or further processing. The pushing device is provided with an adjustable control means for automatically controlling its operation and the distance that is pushes a respective layer of boards with respect to the rest of the stack.

DETAILED DESCRIPTION

Figure 1:
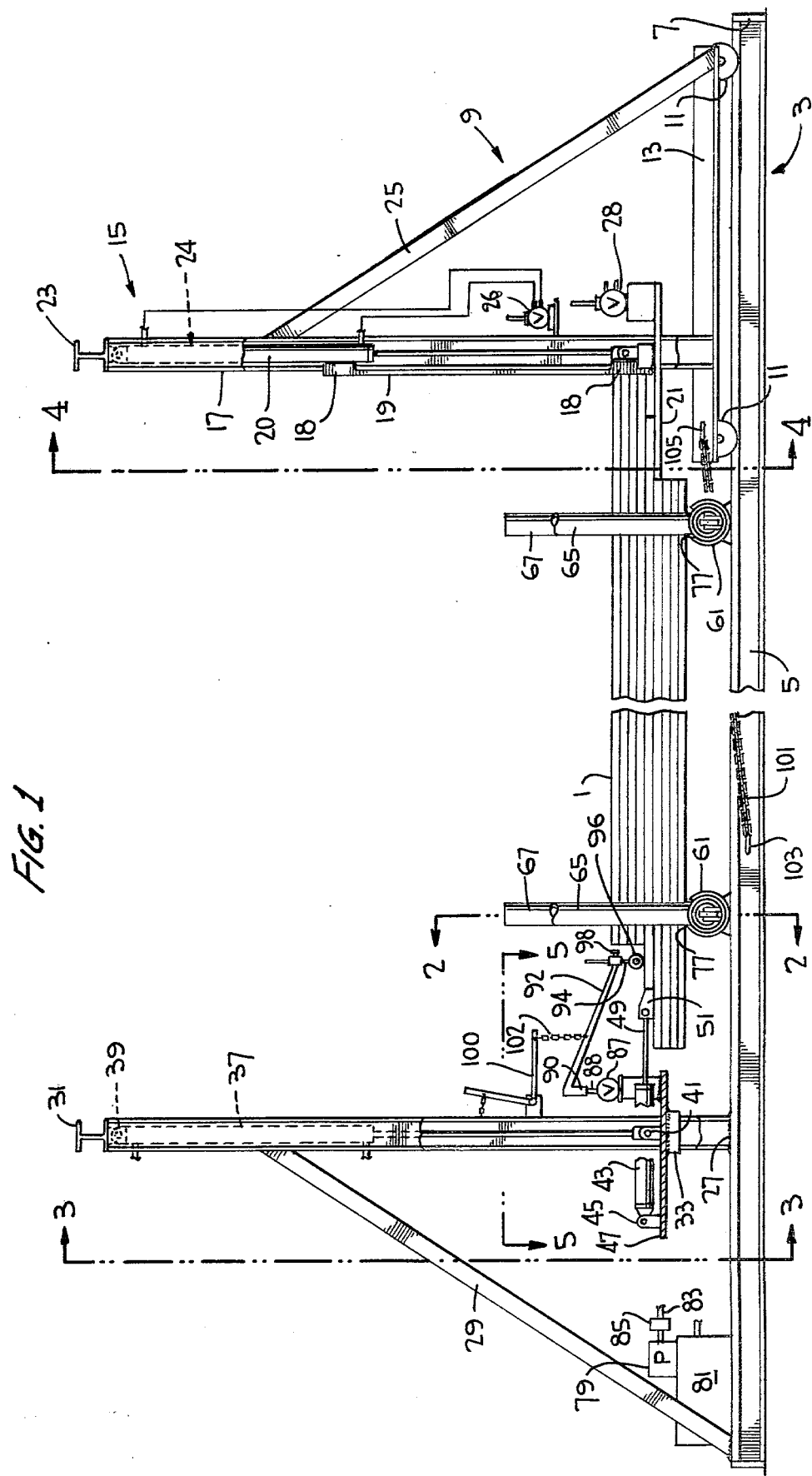
FIG. 1 is a view in elevation of the apparatus of this invention.
Figure 5:
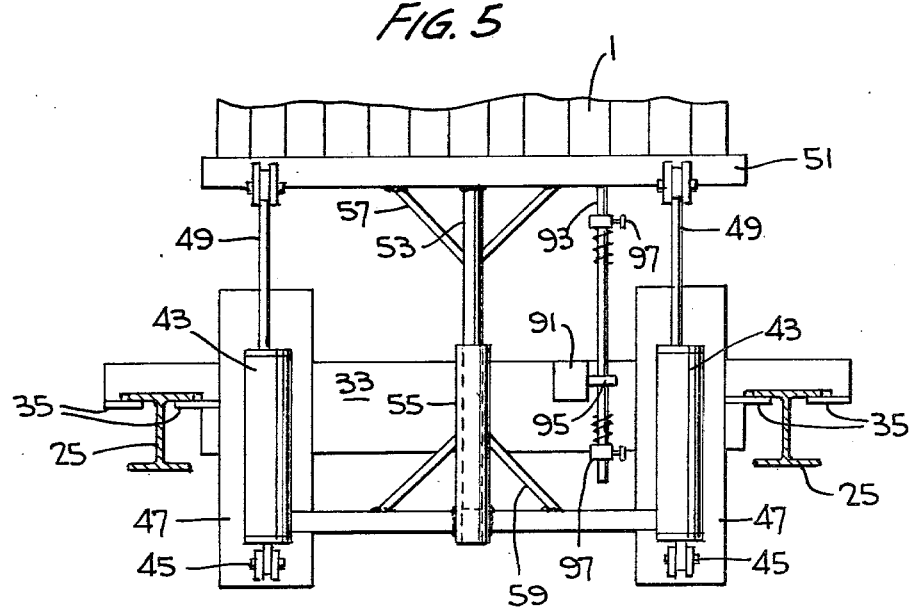
FIG. 5 is a top plan view partly in section of the pushing device showing the push bar and the associated hydraulic cylinders.
Figure 4:
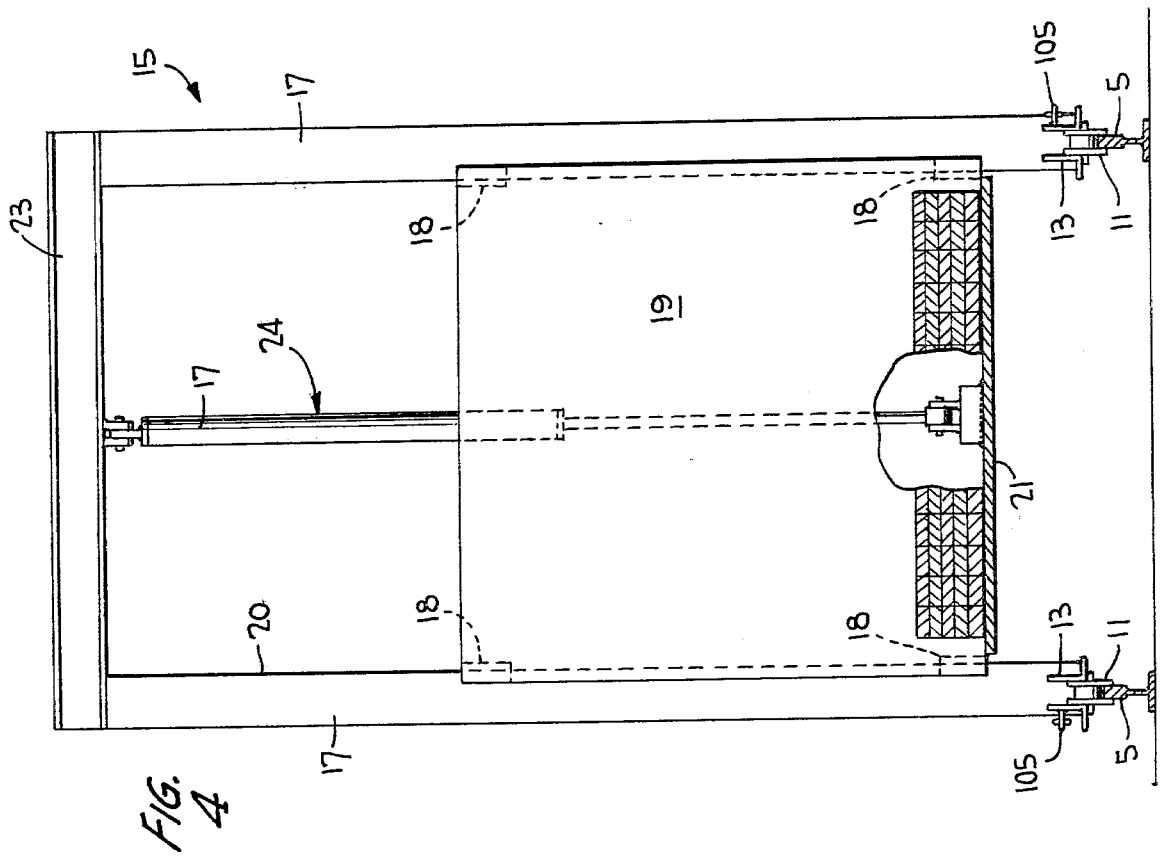
FIG. 4 is an elevation view partly in section taken along the Line IV—IV of FIG. 1 showing the stop means and the vertical adjustment means therefore.
Figure 3:
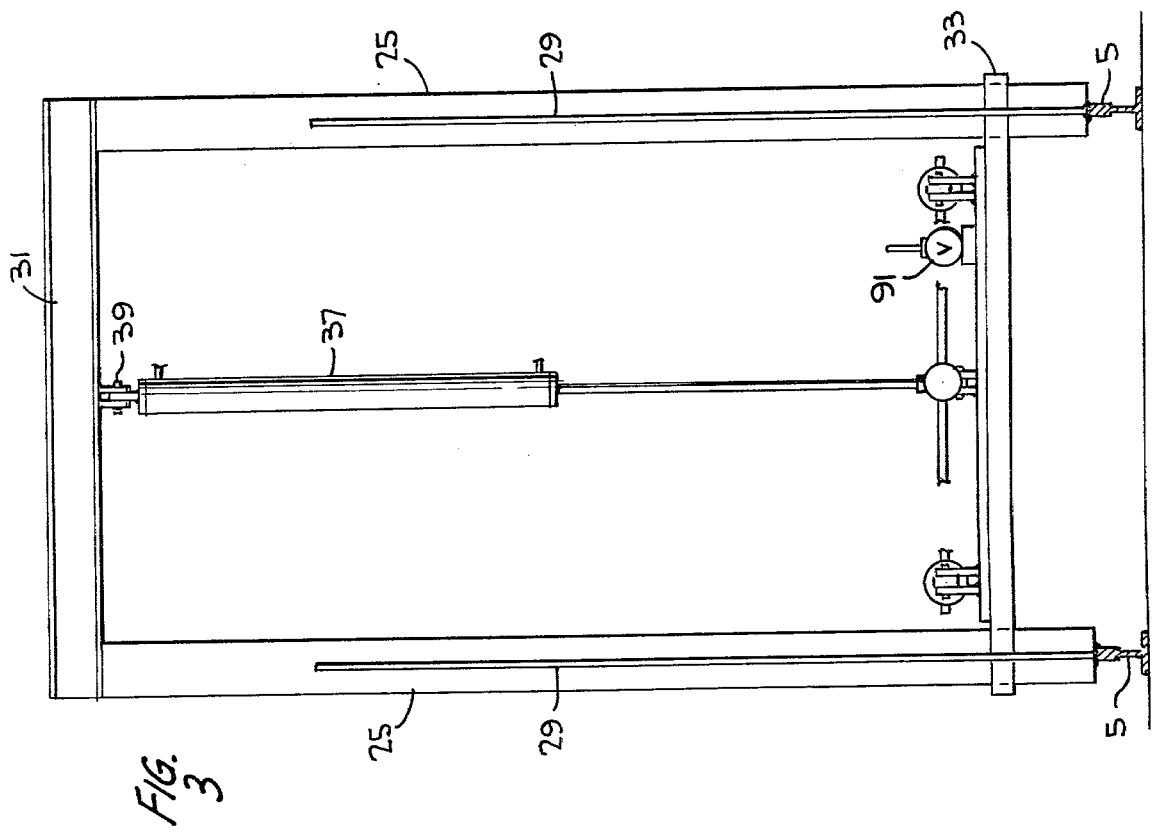
FIG. 3 is an elevation view partly in section taken along the Line III—III of FIG. 1 showing the pushing device and the vertical adjustment means therefor.

The present invention will now be more particularly described with reference to the attached drawings. Referring to FIG. 1, reference number 1 refers to the stack of layers of precut boards which are operated on by the apparatus of this invention. The apparatus comprises a bed indicated generally by 3 which is substantially rectangular and is made of two parallel spaced track members 5 and crossboards 7 at their ends which are suitably attached thereto such as by welding. The bed supports at one end a carriage generally indicated at 9, having wheels 11 rotatably mounted on lower frame member 13 which engages tracks 5 so that the carriage can be moved along the track for a purpose which will hereinafter be described. The carriage 9 comprises a vertical support frame 15 which may be made from vertical and horizontal I-beams welded together to form a rectangular support frame for the vertically-adjustable plate on which the stop means is mounted. The vertical I-beams 17 are rigidly supported by angle support members 25 which are welded at one end to the vertical I-beam and at the other end to the frame member 13 of the carriage. The lower ends of the I-beams are also rigidly attached such as by welding to the lower member 13 of the carriage and any additional reinforcing members may also be welded to this framework, if desired. Rectangular plate member 19 is mounted on the vertical support 17 for vertical movement with respect thereto by a suitable means such as sliding clamps 18 engaging the edges 20 of the I-beams or a plurality of rollers, for example. The lower end of plate 19 has attached thereon, such as by welding, a horizontally disposed plate 21 which, as shown in FIG. 1, extends toward the other end of the apparatus and serves as a stop member by selectively engaging the end of a layer of the stacked boards as shown. A hydraulic piston and cylinder assembly 24 (shown in dotted lines in FIG. 1) is connected at the base of the cylinder member to the midpoint of the crossbeam element 23 so that the piston rod 24 extends downwardly substantially vertically. The outer end of the piston rod is connected such as by welding or some suitable pivotable bracket arrangement to the plate 19 so that by operation of the hydraulic cylinder the plates and the horizontal stop member 21 can be vertically adjusted. In the hydraulic pressure lines which lead to this hydraulic cylinder apparatus 24, there is a valve 26 which controls the flow of hydraulic fluid to operate the piston rod up or down, as desired. This valve 26 is in turn controlled manually or by an indexing device comprising a valve 28 in the hydraulic pressure lines which is synchronized in the pushing bar and automatically controls in response thereto the operation of valve 26 to lower the stop plate 21 one incremental amount which is approximately the thickness of the lumber board so that it is in position to block any movement of the next board when the immediately adjacent board above it is pushed to the right, as shown in FIG. 1. The details of this indexing device are described below. The raising and lowering of stop member 21 and plate member 19 may also be done manually by hand manipulation of valves 26 and 28. At the other end of the bed is a vertical rectangular frame constructed in the same manner as frame 15 with the lower end of the I-beams securely attached, such as by welding, at 27 to the track 5 and reinforced by brace members 29 and having crossbar 31 at the top. Support beam 33 is horizontally mounted for vertical movement on I-beams 36 such as by a sliding clamp means constructed as best shown in FIG. 5. Hydraulic piston and cylinder means 37 operates the beam member 33 for vertical reciprocation by having the base of the cylinder housing attached to the top member 31 of the frame as at 39 and the outer end of the piston rod pivotally connected as at 41 to the support beam 33. Support beam 33 also supports the pushbar assembly which comprises, as best shown in FIG. 5, two spaced hydraulic cylinder devices 43 having the base of each cylinder housing pivotally connected as at 45 to mounting plates 47 which are attached as by welding to the top surface of the beam 33. The outer ends of the piston rods 49 are securely attached to a pushbar 51 so that by simultaneous operation of the hydraulic cylinders 43 the pushbar will be moved substantially horizontally to push the layer of lumber with which it is engaged, as shown in FIG. 1, the desired distance to the right. A reinforcing guide bar 53 is securely attached at its outer end to the pushbar 51 substantially midway between the two hydraulic cylinders 43 and telescopingly engages within tubular member 55, which is stationarily supported on beam member 33, for relative sliding movement with respect thereto. The guide bar assembly provides free-sliding movement between the internal member 53 and external tubular member 55 but is sufficiently close-fitting to guide pushbar 51 in its pushing and retracting movements to avoid undue lateral stress on the hydraulic cylinders 43. For this purpose, the rod element 53 and outer member 55 may be reinforced with angular braces 57 and 59, respectively.

Figure 2:
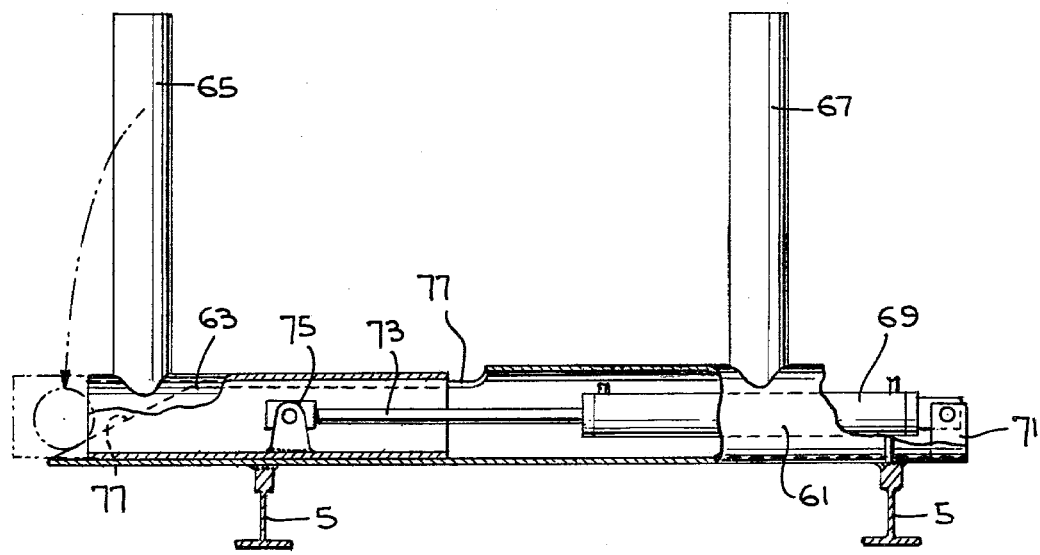
FIG. 2 is an elevation view of the clamping device, partly in section, as viewed along the Line II—II of FIG. 1.

The clamping devices for clamping the edges of the vertical stack of boards to align them in proper position for the stamping operation is best shown in FIGS. 1 and 2. Each clamping device comprises a horizontally disposed tubular member 61 which is supported and securely mounted to the tops of the tracks 5 spanning the distance therebetween. Telescopingly mounted within one end of the tubular member 61 is an inner tubular member 63 having a vertically upstanding bar 65 mounted thereon. At the opposite end of the outer tubular member is mounted thereon a vertically upstanding bar 67 which is substantially parallel to the bar 65. Within outer tubular member 61 is a hydraulic cylinder and piston 69 having the base of the housing of the cylinder pivotally attached to the end of the tubular member 61 or to the base member, as shown at 71. The outer end of the piston rod 73 is attached to a bracket 75 which is secured inside telescoping tube 63. The operation of hydraulic cylinder 69 is controlled by manual valve 70 to thereby move telescoping member 63 and vertical bar member 65 back and forth in a direction transverse to the length of the apparatus. A slot 77 is provided in the top of outer tubular member 61 to accommodate movement of the vertical bar 65 toward and away from bar 67. The outer end of slot 77 is cut away by an angular cut on the side of the slot facing the adjacent end of the apparatus to provide a camming surface for the bar 67 which guides the bar in a descending and ascending path as it leaves the slot 77 under the control of the hydraulic cylinder 61. This cam functions to lower each bar 67 in a rotational path as the bar leaves the slot and in the reverse rotational direction to raise the bar when it is pulled back into the slot by the hydraulic cylinder 61. In this way, each bar 65 is automatically lowered to the substantially horizontal position when it is pushed out of the slot so that the stack of lumber can be delivered to or removed from the apparatus by a forklift truck or some other suitable lifting or hoisting means.

All the hydraulic cylinder means are operated by hydraulic fluid under pressure provided by pump 79 which pumps hydraulic fluid from reservoir 81 through outlet line 83. Line 83 is the hydraulic fluid pressure line through which hydraulic pressure is fed to all the operating piston and cylinder means described through a hydraulic fluid circuit of a suitable type and design which will be well known to anyone familiar with the art of hydraulic pressure systems. A filter 85 is provided in line 83 and suitable operating valves are provided in the hydraulic circuit to individually control the operating piston and cylinder devices. For example, valve 87 is provided in the fluid line leading to hydraulic cylinder 37 which in one position operates the piston and the rod thereof downwardly to lower the support beam 33 and in the opposite position drives the piston and rod upwardly to raise beam 33.

Valve 87 is attached to beam 33 and has a control arm 88 having mounted on the end thereof a swivel sleeve 90 over the valve handle. The open end of the swivel sleeve is connected as by welding to an elongated rod or indexing arm 92 that holds on its outer end shaft 94 with a wheel 96 mounted at its lower end. The attachment between the wheel shaft and indexing arm is adjustable by means of a clamp and set screw 98 allowing the operator to adjust the height of the wheel. The wheel rolls on the board being pushed and drops off the end to the next board to be pushed which operates valve arm 88 and activates cylinder 37 to adjust the push bar 51 vertically into alignment with the next layer to be pushed. The device also has a manual arm 100 pivotally mounted on the frame and is attached by a chain 102 to sleeve with a lever on the operator side to activate cylinder 37 manually to raise the push bar 51 up to start the next bundle.

Similarly, the hydraulic cylinder 24 which raises and lowers the support plate for the stop bar 21 is provided with a manually operable fluid control valve 26.

This valve 26 has a fluid pressure inlet connected to the hydraulic pressure line 83 and fluid pressure outlets connected to fluid cylinder 24 to operate the piston therein connected to rod 24' up and down as desired, in a manner well known to those familiar with the art of hydraulic power systems, to raise and lower the plate 19 and stop bar. After each layer of boards is pushed by the pushing device to the end of its travel against plate 19, stop bar 21 is lowered one thickness of the boards to position it for the next pushing operation by manual operation of control valve 26.

The fluid circuit feeding hydraulic cylinders 43 of the pushbar assembly is provided with a manual control valve 91 for operating the pushbar. The pushbar assembly may also be provided with an automatic limit-switching device which reverses the operation of the hydraulic cylinders 43 when the pushbar has been extended a predetermined distance. This limit-switching means as a part of applicant's invention comprises a rod 93 fixed at one end to the pushbar and slidingly engaging a bracket 95 at its other end which is fixed to the support beam 33. Adjustably attached to rod 93 are limit-stops 97 and 99 which are disposed on opposite sides of the control valve 91 and the manual operating lever extending therefrom. The rod 93 is situated in close proximity to operating handle 94 so that the stop members 97 and 99 will engage the handle and shift it automatically as the bar 93 moves with the pushbar 51. For example, stop member 99 is positioned on the outer end of rod 93 to engage the handle 94 of the control valve 91 when the pushbar 51 has reached the desired extended position and thereby shift the control valve to reverse the flow in the cylinders 43 to automatically begin retraction of the pushbar 51. Stop member 97 is positioned on bar 93 to engage handle 94 of control valve 91 when the pushbar 51 has reached the desired retracted position and can be set to either shift the lever 94 into the neutral position or fully into the power position whereby the pushrod 51 is automatically reversed to again operate the pushbar 51 in the pushing position.

The incremental lowering of stop bar 21 may be automatic by synchronizing the operation of control valve 26 with the operation of the pushing device, such as for example, by operating valve 26 through an indexing valve 28 which is hydraulically controlled by valve 91, or a duplicate thereof, whereby upon reaching the outward limit of travel of the push bar 51, limit-stop 99 shifts valve 91 (as previously explained) or a duplicate to the opposite position which activates indexing valve 28 to operate control valve 26 to lower stop bar 21 one increment or thickness of the next layer of boards.

A simple adjustable chain device is provided for retaining the movable carriage in the desired position against the force exerted by the pushbar during operation of the apparatus. This device comprises a chain 101 anchored at one end 103 to the track and adjustably connected to a hook member 105 which is fixed to the lower base member 13 of the carriage 9. By simply adjusting the chain's length on the hook member 105 the movement of the carriage to the right, as viewed in FIG. 1, can be limited to the desired amount.

It is believed that the operation of the apparatus of this invention will be clear from the above description. With the required hydraulic pressure in the main hydraulic pressure feed line 83 control valve 70 is first operated to extend the inner tubular member 63 of the clamps to their outer most position whereby clamping bar members 65 are lower to the horizontal position by the camming surface at the outer end of slot 77. The push bar assembly is withdrawn into the retracted position and a load of vertically stacked layers of lumber board arranged in a rectangular stack is placed on top of the outer tubular member 61 of the clamps in position for marking. The valve 70 is then operated in the opposite direction to draw the clamping bar 65 towards the opposite clamping bar 67 whereby they are first cammed to the vertical position by the camming surface on the outer end of slot 77 and then into the final clamping position to hold the stack of lumber board in alignment. The stop bar 21 is then raised by manual control of valve 26 so that it is at the level of the second layer of boards from the top. The pushing assembly is then raised by manual operation of valve 87 and positioned so that the indexing wheel 96 rests on the top of the top layer of boards, which are then marked as desired. The push bar assembly is then activated by manipulating valve 91 from the neutral to the operating position whereby hydraulic pressure is sent to the hydraulic cylinders 43 to drive the piston rods 49 and push bar 51 into engagement with the top layer of boards and thereafter to push the top layer of boards to the right into engagement with the plate member 19. At that position limit stop 99 engages the lever on control valve 91 and shifts it into the opposite position wherein it reverses the travel of the piston in cylinder 43 and retracts the push bar 51. Simultaneously with the engagement of limit stop 99 with the valve lever 91, if connected for automatic operation, valve 91 or a duplicate valve in the same position for actuation by limit stop 99 operates indexing valve 28 which in turn operates control valve 26 to lower stop bar 21 one increment, or thickness of a layer of boards. Also, simultaneously with push bar 51 reaching its outer most position, indexing roller 96 drops off the end of the top layer of boards onto the top surface of the second layer of boards and in so doing rotates indexer arm 92 to shift valve lever 88 into the position where valve 87 directs hydraulic pressure to hydraulic cylinder 37 which then operates to lower push bar assembly on beam 33 one increment, or thickness of the next layer of boards whereby indexing arm 92 is raised to operate lever 88 to close valve 87 and thus stop the operation of hydraulic cylinder means 37 in the proper position for the next pushing operation. When pushbar 51 is retracted to the fully retracted position limit stop 97 engages the lever on control valve 91 and moves it into the opposite position wherein it directs fluid pressure to hydraulic cylinders 43 to again drive push bar 51 outwardly to push the second layer of boards to the right as viewed in FIG. 1 into engagement with the stop plate 19. The sequence of operation is continued until the entire stack of boards has been marked. Thereafter valve 70 is operated manually to extend the clamp bars 65 outwardly to drop them into the horizontal position. The stack of lumber is now in position to be removed and replaced with the new stack for marking. Although the sequence of operations can be performed automatically as described above, it will be understood that they may also be accomplished by manual operation of the control valves in the desired sequence.

What I claim is:

1. A wood handling machine for handling stacked layers of board lumber to facilitate marking the boards, comprising a support bed for supporting a stack of boards in layers, clamping means to clamp the stacked layers of boards to hold the layers in alignment, pushing means to move at least one layer of boards at a time to uncover the adjacent layer to facilitate marking said adjacent layer, means to limit the distance said layer of boards is moved, stop means to prevent movement of said adjacent layer, and fluid pressure means to operate said clamping means, pushing means and stop means.

2. The wood handling machine as claimed in claim 1 wherein said support bed comprises a substantially rectangular frame constructed of I-beams, and said clamping means comprises at least two spaced clamps attached to said bed, each clamp comprising telescoping members, elongated clamping bars on said telescoping members, and clamp operating means to move said telescoping members with respect to each other to releasably clamp said stack of boards between said clamping bars.

3. The wood handling machine as claimed in claim 2 wherein said telescoping members comprise inner and outer tubular members, said outer tubular member being attached to said bed and having a slot in one end thereof adjacent the inner tubular member, said inner tubular member being rotatable, one of said clamping bars being attached to said inner tubular member to travel in said slot, a camming surface on the outer end of said slot to guide said one of said clamping bars to rotate substantially 90 degrees between a clamping position and a loading position during its travel at said outer end of said slot, and said clamp operating means comprising a fluid pressure cylinder and piston means operably connected to said inner and outer tubular members and valve means to control said cylinder and piston means.

4. The wood handling machine as claimed in claim 1 wherein said pushing means comprises a pusher frame positioned in spaced relationship to one of said clamping means and adjacent one end of said stack of boards held thereby, a beam member movably connected to said pusher frame for guided movement with respect to said bed frame and across the end of said stack of lumber, fluid pressure means operatively connected between said pusher frame and said beam member to move said beam member, a pushing bar mounted on said beam for movement into engaging and retracted positions with respect to the adjacent ends of said boards and for pushing said boards a predetermined distance, fluid pressure means operatively connected between said pushing bar and said beam member, valve means to control said fluid pressure means, and indexing means mounted on said beam member to control the movement of said beam member so that said pushing bar is incrementally moved with respect to said stack a distance substantially corresponding to the thickness of at least one layer of boards.

5. The wood handling machine as claimed in claim 4 wherein said pusher frame is attached to said bed frame, said fluid pressure means connected between said pushing bar and said beam member comprises at least one piston and cylinder means having a piston rod connected at its outer end to said pushing bar and the cylinder thereof connected to said beam member, and further comprising a telescoping guide means mounted on said beam member and operatively connected to said pushing bar to guide said pushing bar during its movement, said valve means to control said pushing bar piston and cylinder means comprising a pushing bar fluid pressure control valve mounted on said beam, and having an operating lever, a rod-like member connected at one end to said pushing bar and slidingly engaging a bracket mounted on said beam member at the other end, limit-stop members adjustably mounted on said rod-like member to operatively engage said operating lever on said pushing bar control valve at the limits of movement of said pushing bar to shift said lever into another position.

6. The wood handling machine as claimed in claim 4 wherein said indexing means comprises a fluid pressure control valve mounted on said beam member having its inlet connected to a source of fluid pressure and its outlets connected to said fluid pressure means for moving said beam member in opposite directions, a control lever for operating said valve, a link member connected at one end of said control lever, and having an adjustable stem on the other end, a roller on one end of said stem, said link being operatively positioned during use so that said roller engages the surface of the board in position to be marked when said indexing valve control lever is in the position where said beam member is stationary and said pushing bar is operating in the pushing mode, said roller rolling along the board being pushed and when said roller drops off the end of the board being pushed said link shifts said control lever to move said beam member and said pushing bar via said indexing control valve and associated fluid pressure means said predetermined incremental distance.

7. A wood handling machine as claimed in claim 1 wherein said means to limit the distance said layer of boards is moved and said stop means comprises a carriage movably mounted on said bed frame near the end opposite that at which the pushing means is located, a frame mounted on said carriage extending therefrom in the direction of the height of said stack of boards, a limit plate movably mounted on said carriage frame and spanning the width of said stack of boards, fluid pressure means operatively connected between said carriage frame and said limit plate to move said limit plate along said carriage frame, control valve means operatively connected to said limit plate fluid pressure means, said stop means comprising a plate-like member attached to the end of said limit plate and movable therewith extending toward said stack of boards and engaging at its outer end at least one layer of boards adjacent the layer to be moved, and means adjustably connected between said carriage and said bed frame to limit the movement of said carriage away from said stack of boards.

8. A wood handling machine as claimed in claim 5 wherein said means to limit the distance said layer of boards is moved and said stop means comprises a carriage movably mounted on said frame near the end opposite that at which the pushing means is located, a frame mounted on said carriage extending therefrom in the direction of the height of said stack of boards, a limit plate movably mounted on said carriage frame and spanning the width of said stack of boards, fluid pressure means operatively connected between said carriage frame and said limit plate to move said limit plate along said carriage frame, control valve means operatively connected to said limit plate fluid pressure means, said stop means comprising a plate-like member attached to the end of said limit plate and movable therewith extending toward said stack of boards and engaging at its outer end at least one layer of boards adjacent the layer to be moved, and means adjustably connected between said carriage and said bed frame to limit the movement of said carriage away from said stack of boards, and further comprising a stop bar fluid pressure indexing valve having an outlet operatively connected to said limit plate control valve and an inlet operatively connected to said pushing bar control valve so that when said pushing bar reaches its extended limit of travel said pushing bar control valve also operates said stop bar indexing valve which operates and controls said limit plate control valve to move said limit plate and stop plate one incremental distance comparable to at least one thickness of said layer of boards to position said stop plate to prevent movement of the next layer of boards adjacent to the next layer to be moved.

9. A wood handling machine as claimed in claim 6 wherein said means to limit the distance said layer of boards is moved and said stop means comprises a carriage movably mounted on said frame near the end opposite that at which the pushing means is located, a frame mounted on said carriage extending therefrom in the direction of the height of said stack of boards, a limit plate movably mounted on said carriage frame and spanning the width of said stack of boards, fluid pressure means operatively connected between said carriage frame and said limit plate to move said limit plate along said carriage frame, control valve means operatively connected to said limit plate fluid pressure means, said stop means comprising a plate-like member attached to the end of said limit plate and movable therewith extending toward said stack of boards and engaging at its outer end at least one layer of boards adjacent the layer to be moved and means adjustably connected between said carriage and said bed frame to limit the movement of said carriage away from said stack of boards, and further comprising said limit plate control valve being operatively connected to said pushing bar indexing valve so that when the latter valve is operated by said indexing arm to move said beam member and said pushing bar said incremental distance, said stop bar is simultaneously moved the same incremental distance.

* * * * *